United States Patent [19]
Meyer et al.

[11] Patent Number: 5,937,533
[45] Date of Patent: Aug. 17, 1999

[54] INSTRUMENT FOR MEASURING LENGTHS OR ANGLES

[75] Inventors: Hans Ulrich Meyer, Morges; Daniel Clerc, Crissier, both of Switzerland

[73] Assignee: Sylvac SA, Crissier, Switzerland

[21] Appl. No.: 08/873,589

[22] Filed: Jun. 12, 1997

[30] Foreign Application Priority Data

Jul. 2, 1996 [CH] Switzerland .............................. 1648/96

[51] Int. Cl.⁶ ..................................................... G01B 7/02
[52] U.S. Cl. ............................................... 33/832; 33/833
[58] Field of Search ..................................... 33/832, 833

[56] References Cited

U.S. PATENT DOCUMENTS

| | | |
|---|---|---|
| 4,841,225 | 6/1989 | Meyer . |
| 4,845,855 | 7/1989 | Meyer . |
| 4,924,598 | 5/1990 | Gruhler ..................................... 33/832 |
| 5,040,308 | 8/1991 | Meyer . |
| 5,373,645 | 12/1994 | Bezinge et al. ........................... 33/832 |

*Primary Examiner*—Bernard Roskoski
*Attorney, Agent, or Firm*—Young & Thompson

[57] ABSTRACT

A measuring instrument comprises a column (10) on which is mounted a carriage (11) with a drive cursor (12) and a measuring cursor (20) sliding on the drive cursor (12) and carrying a measuring contact (24) and a measuring device (40). A measuring force device (25) is arranged between the two cursors and determines, thanks to a lever (26) a rest position and two measuring positions vertically upwardly or downwardly offset or corresponding to a predetermined measuring force on the member to be measured. A motor (15) displaces the drive cursor (12) and the position detector (36) permits measuring the relative position between the two cursors. A control unit (35) controls the speed and direction of rotation of the motor (15) as a function either of the signals (44) received from the position detector (36) or from two external contacts (42, 43). The carriage (11) is first displaced by means of the external contacts (42, 43) and as soon as the lag between the two cursors reaches an upper or lower limit, the control of the motor is effected as a function of the signals received from the position detector (36). There is thus obtained a double subjection of the speed of movement of the carriage and of the measuring force, permitting very precise and rapid measurements and rendering easy the measurement of profiles.

15 Claims, 3 Drawing Sheets

INSTRUMENT FOR MEASURING LENGTHS OR ANGLES

The present invention relates to an instrument for measuring lengths or angles comprising a rail, a carriage disposed on this rail, the carriage having a first portion adapted to be driven along this rail, and a second portion driven by the first portion along the rail, and carrying a measuring contact adapted to coact with a member to be measured, the second portion being adapted to be displaced relative to the first portion against the force of an element for returning from a rest position toward at least one measuring position in which the measuring contact exerts a predetermined measuring force on the member to be measured.

There are known instruments of this type described for example in EP-A-0223736 or EP-A-0421922.

These instruments comprise two partial cursors connected to each other by a resilient retention device permitting obtaining a predetermined measuring force. One of the partial cursors is generally driven by a manual displacement device and the other carries the measuring contact. These instruments permit effecting exact measurements with a low measuring force or pressure. However, when the position of the measuring contact on the piece to be measured is slightly modified, for example when the contact takes its exact position in a screw thread or on an irregular surface, the measuring force is changed and there is obtained accordingly a result which can have a substantial error. The known instruments are moreover difficult to measure a profile obtained by relative displacement of the piece to be measured, because it is necessary to adjust precisely and continuously the manual measurement force.

The present invention has for its object to provide an instrument in which the displacement of the carriage is effected in a motorized manner and in which the measuring force is adjusted automatically and precisely, thereby permitting the measurement of a profile with a predetermined constant measurement force.

Moreover, the instrument must permit exact positioning of the measuring contact on the pieces to be measured having a non-planar surface, whilst maintaining during positioning a predetermined measuring force.

These objects are obtained by the fact that the instrument comprises a driven member arranged so as to drive the first portion along the rail and a position detector adapted to measure the relative displacement between the two portions of the carriage and to act on the driven member to drive the first portion such that the second portion will occupy a predetermined relative position relative to the first portion corresponding to said measuring position.

By these characteristics, the use of the instrument is greatly facilitated and rendered more precise, because the positioning of the carriage and the application of a predetermined measurement force are obtained in a motor-driven and precisely controlled manner. The position of the measuring contact on the member to be measured could be modified whilst keeping exactly the same measuring force. There is thus obtained a double control effect, on the one hand, for positioning the carriage and, on the other hand, of the measuring force exerted on the member to be measured.

Preferably, the instrument comprises first control means arranged so as to receive signals corresponding to the relative position of the two portions of said position detector and to control by first settings the driven member such that it establishes a relatively constant position between the two portions corresponding to the measuring position, the first portion being driven so as to follow the second portion, when the measuring contact of this latter occupies different positions relative to the rail on the member to be measured.

These characteristics permit measuring very easily a profile with an exactly predetermined and constant measuring force.

Desirably, the instrument comprises second control means adapted to receive external instructions and to control by means of second settings the driven member so as to displace the first portion at least when the second portion occupies said rest position.

The carriage can thus be displaced rapidly and as desired by the user.

According to a preferred embodiment, the instrument comprises a control unit comprising said first and second control means, this control unit being arranged a) so as to render active the second control means when said signals received from the position detector are below an upper limit and above a lower limit, and b) so as to render active the first control means, when said signals received from the position detector are either greater than the upper limit to establish a first measuring position between the two portions of the carriage, or below the lower limit to obtain a second measuring position between the two portions of the carriage.

There is obtained by these characteristics a very precise and very effective embodiment, whilst having a simple operation.

The control unit can thus be preferably arranged a) so as to control the motor member by means of first front or rear settings emitted by said first control means and by means of second front or rear settings emitted by said second control means, b) so as to inhibit the second forward setting when said received signals are above the upper limit, c) so as to inhibit the second rear setting when said received signals are below the lower limit, d) so as to inhibit the first front and rear settings when the signals received are below the lower limit and the second forward setting is actuated, either when the signals received are above the upper limit and the second rear setting is activated.

The interactions between the mode user and the automated positioning are thus carried out in a simple and precise manner permitting avoiding errors of measurement or of operation and facilitating the manipulation by the user.

The position detector is preferably arranged so as to work with a physical size varying substantially linearly with the relative displacement between the two portions of the carriage.

It can be constituted by a Hall effect detector. These detectors have the advantage of reduced weight, stable and precise operation, simple construction and low cost.

Preferably, the control unit comprises a logic circuit coacting with at least two first comparators arranged so as to compare the signals received from the position detector with said upper and lower limits and arranged so as to actuate at least two first switches each having a first input adapted to receive said first settings, a second input adapted to receive said second settings, and an output arranged so as to control the rotation of the driven member.

There is thus obtained an electronic control of reliable operation, adapted to the application in question whilst having a number of reliable components.

Preferably, the signals received from the detector are sent to a first input of two first amplifiers whose gains are inverted relative to each other, of which the output of each is connected to one of the first switches and whose second input is adapted to be connected for each to a first or a second voltage lag, two second switches controlled by one of the first comparators being adapted to switch the second input between the first and the second lag voltage according to whether the measurement position is above or below at least one of said limits.

These characteristics permit a control unit of very reliable construction and of a cost which is not much increased.

The motor is preferably connected to the center of an H bridge whose upper arm is connected by means of two second amplifiers to the first switches and whose lower arm is connected to these latter by means of two second comparators adapted to compare the settings leaving the first switches to an engagement threshold of the motor.

Said lower arm is thus very advantageously connected to a third amplifier whose output is connected to the inputs of said second amplifiers so as to ensure a stable speed of the motor under different conditions of load.

These characteristics ensure compensation of the effect of the internal resistance of the motor, which is particularly useful at low speed where variations of the load couple give rise to large variations of speed. This permits maintaining a steady speed, without at the same time requiring a tachometer.

Other advantages will become apparent from the characteristics recited in the dependent claims and of the following motor detailed description of the invention with the help of drawings which show schematically and by way of example one embodiment.

The embodiment described relates to an instrument for measuring lengths along a vertical axis, but it could easily be adapted to an instrument for measuring length in a horizontal direction or any other direction or to measure angles.

Figure 1:
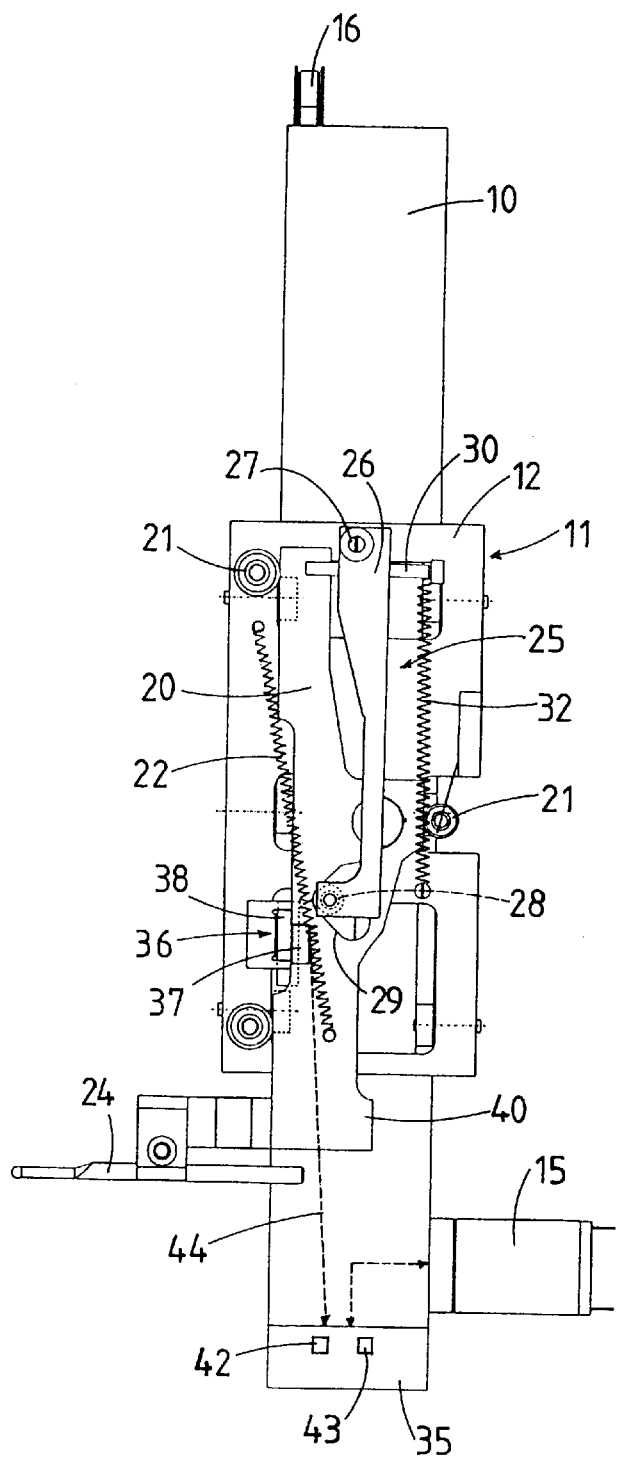
FIGS. 1 and 2 are front and side views of this embodiment.
Figure 2:
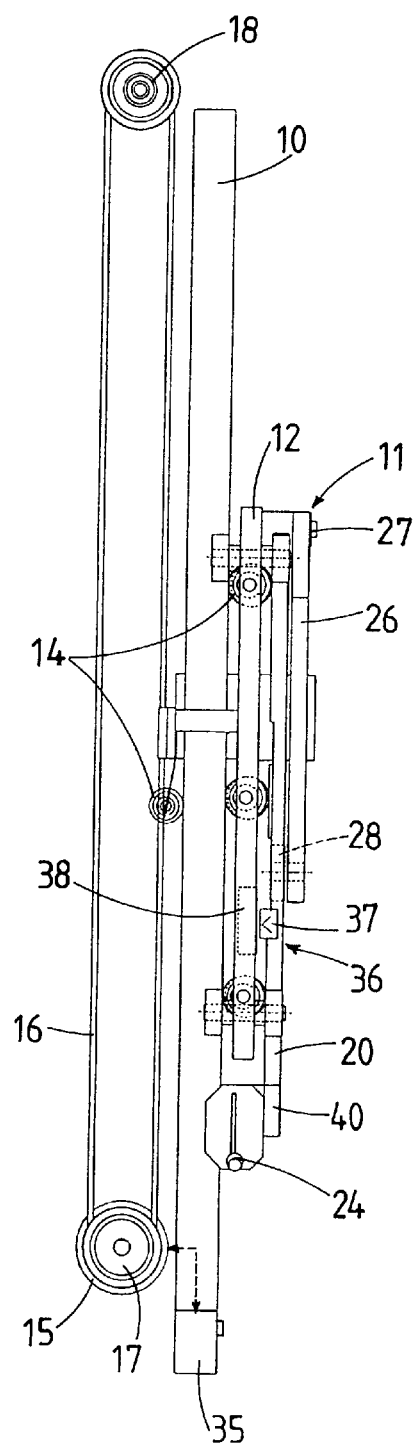

The instrument to measure length comprises, with reference to FIGS. 1 and 2, a measuring column or rail 10 on which is slidably mounted a carriage 11. This latter is arranged in two portions of which a first portion forms a drive cursor 12 mounted on rollers 14 on the column 10. A motor 15 is adapted to move this drive cursor 12 by means of a belt 16 disposed over pulleys 17, 18 whose axles are secured to the column. The weight of the carriage 11 is preferably balanced by a counterweight device or a spring, not shown, bearing on the column 10, as is described in patent applications EP-A-0421922 and EP-A-0223736.

The second portion of the carriage 11 is constituted by a measuring cursor 20 mounted slidably on the drive cursor 12 thanks to rollers 21. A spring 22 connects the two cursors 12, 20 and is adapted to compensate the weight of the measuring cursor 20 suspended from the drive cursor 12.

The measuring cursor 20 is provided with a measuring contact 24 adapted to enter into contact with a member to be measured. A measuring force device 25 arranged between the two cursors 12, 20 determines a rest position between the two cursors 12, 20 and produces a measuring force or pressure increasing when the contact 24 enters into contact from above or from below with the object to be measured and that the transport cursor 12 is displaced beyond the contact position.

The device 25 is constituted by a lever 26 mounted pivotally at 27 on the drive cursor 12 and provided at its free end with a roller 28 coacting with a V-shaped surface 29 forming a cam on the measuring cursor 20. The lever 26 also carries a screw 30 whose longitudinal position on the lever 26 is adjustable. A spring 32 is stretched between the free end of the screw 30 and the transport cursor 12 and arranged so as to urge the roller 25 in the direction of the V surface 29 to determine the rest position between the two cursors 12, 20. The force with which the roller 28 is urged against the V surface 29 can be adjusted by means of the screw 30.

The instrument also comprises an electronic control unit 35 arranged to control the operation, speed and direction of rotation of the motor 15 according to particular operational settings described later.

A position detector 36 determines the displacement or the relative position between the two cursors 12, 20 and transmits position settings, namely signals corresponding to the predetermined relative position, to the electronic control unit 35. This detector operates preferably with a physical size varying substantially linearly with the relative position. By using as physical size the magnetic field, there is preferably used a linear Hall effect detector 37 mounted on the measuring cursor 20 and coacting with a permanent magnet 38 fixed facing the drive cursor 12.

The measuring cursor 20 also carries a measuring device 40 coacting with a scale (not shown) secured to the column 10 and adapted to indicate precisely the position of the height of the measuring contact 24 by means of a displace device. This measuring device could for example be constituted by the capacitative device described in EP-A-0271436.

The electronic control unit 35 is arranged so as to control the speed and direction of rotation forward or reverse of the motor 15 either according to forward or reverse speed settings supplied by the contacts 42, 43 actuated by the user, or according to position settings 44 supplied by the position detector 36. According to the general measurement principle, the drive cursor 12 is displaced according to the speed settings until the measurement contact 24 comes to contact with the member to be measured to give a certain measurement pressure by relative displacement between the two cursors 12, 20. This relative displacement having been achieved, the control unit 35 adjusts the operation of the motor 15, namely its direction of rotation and its speed, automatically as a function of the position settings 44 supplied by the detector 66 to bring the drive cursor 12 into a measuring position such that there exists a greater or lesser predetermined lag between the two cursors 12, 20 relative to the rest position corresponding to a given measuring force.

When the measuring contact 24 moves, the motor 15 automatically moves the drive cursor 12 to return to said measuring position between the two cursors. The measuring contact can then follow a measuring profile whilst maintaining constant the measuring force. During this automatic positioning of the drive cursor 12 by the unit 35 by means of position settings 44, the speed settings supplied by one of the contacts 42 or 43 bringing the drive cursor 12 toward the measuring position, is inhibited.

On the other hand, the speed setting moving the drive cursor 12 away from this measuring position can be rendered active for one of the contacts 42 or 43 to inhibit the automatic position control by means of the position settings 44 and to move the measuring contact 24 away from the member to be measured, for example when it is desired to remove this latter after having taken the measurement.

Figure 3:
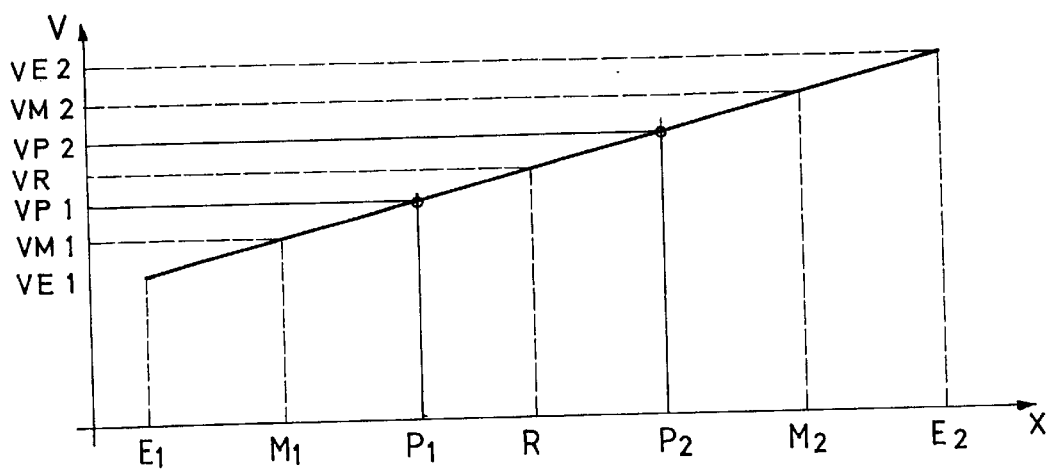
FIGS. 3 to 5 show diagrams illustrating the manner of operation of the control unit of the instrument.
Figure 4:
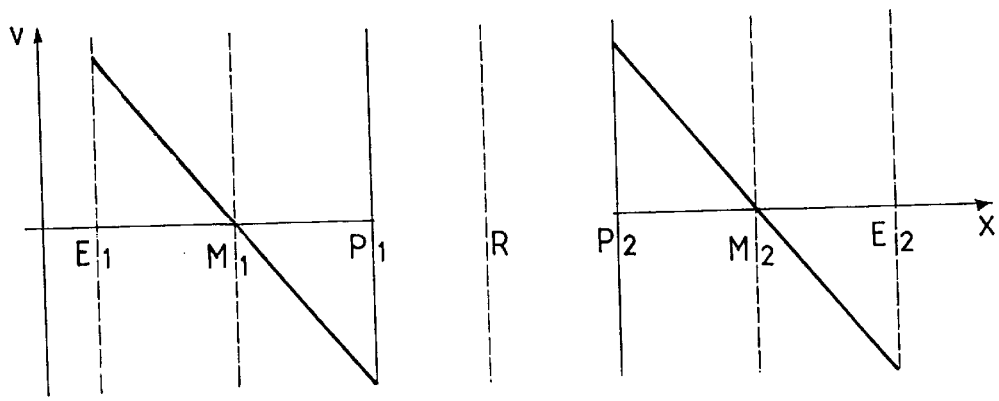
Figure 5:
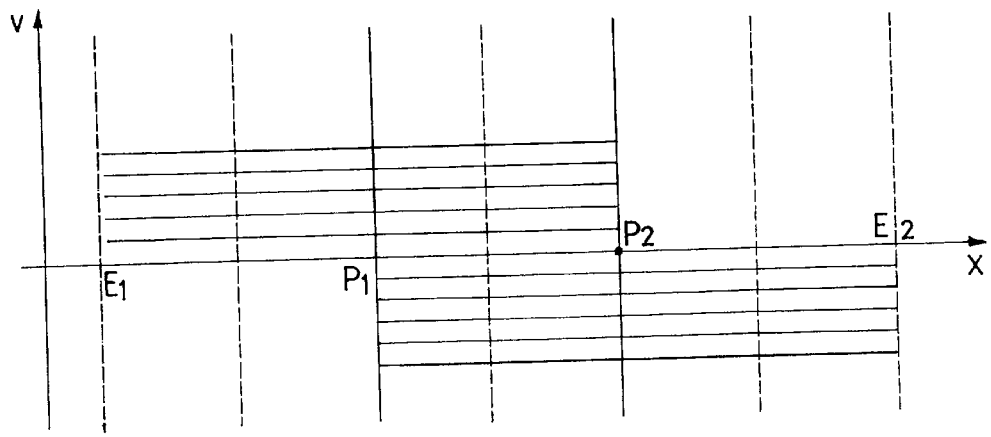

The diagrams of FIGS. 3 to 5 permit visualizing more precisely this manner of operation.

The diagram of FIG. 3 shows the position settings in the form of voltages supplied by the Hall effect detector 37 as a function of the relative position x of the permanent magnet 38 fixed on the drive cursor 12.

The diagram of FIG. 4 shows the speed v of the motor when it is controlled by position settings 44 as a function of the relative position x.

At the center in the rest position R of the two cursors 12, 20, the detector 36 supplies a voltage VR. The movement of the carriage 11 is effected as a function of the speed settings produced by the contacts 42, 43. When the measuring contact 24 enters into contact with the member to be measured either by reverse rotation rising or by forward rotation descending, the relative position x varies in a first or second direction to reach the positions P1 or P2 corresponding to limit setting values VP1 or VP2. At this moment, the position settings 44 are actuated until the relative position X between the two cursors 12, 20 reaches the measuring position M1 or M2. In the regions P1–M1 and M2–E2, the motor rotates reversely to reach the measuring positions M1, respectively M2, whilst in the ranges P2–M2 and M1–E1 the motor rotates forward to reach the measuring positions M2, respectively M1. In these measuring positions M1, respectively M2, corresponding to the approach of the member to be measured from below upwardly, respectively from the top downwardly, the speed of the motor is zero and the force produced by the device 25 on the member to be measured is equal to the predetermined measuring force.

FIG. 5 shows the speed v of the motor when it is controlled by speed settings from the contacts 42, 43 as a function of the relative position x.

In the range between the positions P1 and P2 the motor can be freely actuated in reverse or forwardly according to the desired speed.

In the region P1-E1, the measuring contact 24 is brought into contact with the member to be measured by reverse rotation of the motor causing the carriage 11 to rise. In this region, the reverse rotation of the motor controlled by the contact 43 is inhibited, whilst the forward rotation of the motor controlled by the contact 42 causing the carriage 11 to descend, can be actuated.

Conversely, in the region P2-E2, the measuring contact 24 is brought into contact with the member to be measured by forward rotation of the motor causing the carriage 11 to descend. In this region, only the reverse rotation of the motor controlled by the contact 43 raising the carriage 11 is possible in order to be able to cause the contact 24 to move away from the member to be measured.

The motor 15 is preferably a DC motor for reasons of simplicity of electronic control.

Figure 6:
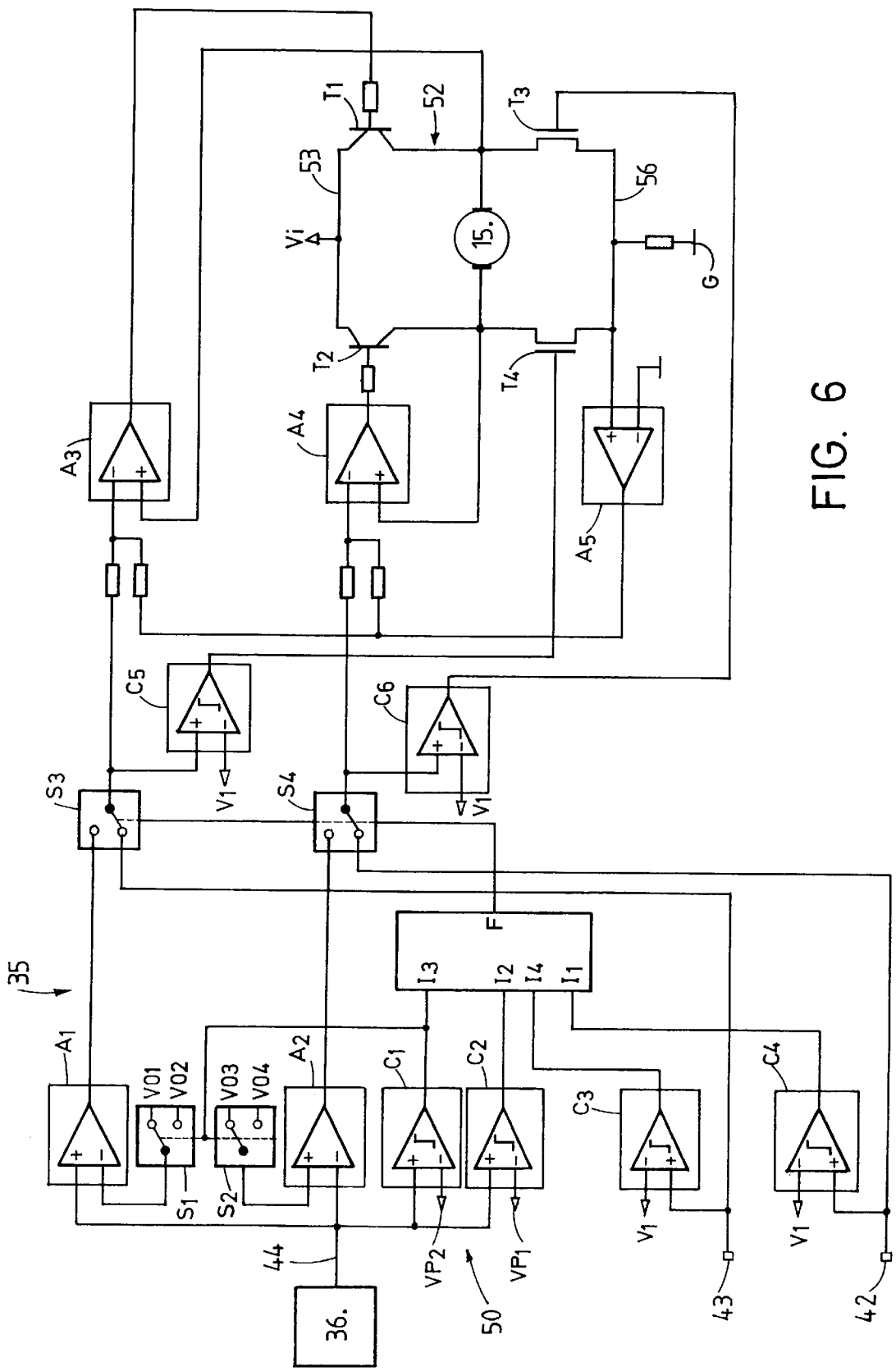
FIG. 6 is a schematic of the electronic principle of this control unit.

The control unit 35 of the motor, whose electronic circuit 50 is shown in FIG. 6, is DC with a single supply voltage Vi. This type of control is particularly simple and low cost.

The speed settings are supplied by the forward and reverse contacts 42 and 43 which are preferably of the piezoelectric type. The value of the set voltage for speed is thus proportional to the pressure exerted on the contacts 42, 43, which permits easy manual control and rapid and precise displacement of the carriage 11. The speed of the motor resulting from the action of these contacts 42, 43 is shown by the horizontal lines in the diagram of FIG. 5.

The position data are supplied by the position detector 36 and their value is amplified by the amplifier A1, whose gain is positive, and by the amplifier A2, whose gain is negative (FIG. 6). The amplifier Al thus supplies to the motor amplified operational settings concerning the regions P2–M2 and M1–E1 of FIGS. 3 and 4 corresponding to a forward rotation of the motor, whilst the amplifier A2 supplies amplified operational settings relating to the fields P1–M1 and M2–E2 corresponding to reverse rotation of the motor.

The lag or offset voltages VO1 and VO2 of the amplifier A1 are obtained by the switch S1, those VO3 and VO4 of the amplifier A2 by the switch S2. The switching of the switches S1 and S2 is controlled by the voltage VP2 (see FIG. 3) corresponding to the position setting of the upper limit P2 supplied by the detector 36 and the comparator C1, accordingly as the relative position x is comprised between P1–E1 or P2–E2 (FIGS. 3 and 4).

The selection between the speed setting or the position setting is effectuated by switches S3 and S4. The logic circuit L determines by its output signal F the position of the switches S3 and S4 and comprises for this purpose inputs I1 connected to a comparator C4 whose inputs are connected to the contact 42 and to a voltage V1 corresponding to the starting threshold of the motor 15.

I4 connected to a comparator C3 whose inputs are connected to the contact 43 and to the voltage V1.

I2 connected to a comparator C2 whose inputs are connected to the position setting 44 given by the position detector 36 and to a voltage equal to VP1 corresponding to the relative position V1, I3 connected to the comparator C3 whose inputs are connected to the position setting and to a voltage equal to VP2, corresponding to the relative position P2.

The selection logic of the switches S3 and S4 effected by the logic circuit L can be represented in Boolian logic by the formula:

$$\overline{F}=(I2.\overline{I3})+(I2.I3.I4)+(\overline{I2}.I3.I1)$$

When $\overline{F}=1$, the movement of the carriage 11 is controlled by contacts 42 and 43, but on the contrary when $\overline{F}=0$ the displacement is controlled by the position detector 36.

This logic corresponding to the following functions:
inhibition of subjection of positions 36 in the range P1–P2.
inhibition of the forward speed setting P1–E2.
inhibition of the reverse speed setting 43 in the range of P1–E1.
inhibition of the subjection of position 36 for a forward disengagement in the region P1–E1.
inhibition of the subjection of position 36 for reverse disengagement in the region P2–E2.

The filtered settings leaving the switches S3, respectively as S4, are then brought to differential amplifiers A3, respectively, A4, whose outputs are connected to the base of transistor T1, respectively T2 of an upper leg 53 of an H-shaped bridge 52 connected to the supply voltage Vi and to ground G. This bridge also comprises a lower leg 56 also comprising two transistors T3 and T4. The motor 15 occupies the central leg of the H-shaped bridge 52. In differential amplifiers A3 and A4, the tension setting from the switches S3 and S4 is compared to that supplied to the motor 15. The voltage of motor 15 is thus subject to the voltage setting from the switches S3 and S4. The operation of the H-shaped bridge 52 permits the speed of the motor to vary positively or negatively.

The voltage settings leaving the switches S3 and S4 are also brought to the comparators C5 and C6, in which they are compared to the voltage V1 corresponding to the start up threshold of the motor. The outputs of the comparators C5 and C6 are connected to the transistors T3 and T4 of the lower leg 56 of the H-shaped bridge. This latter is moreover connected to the input of an amplifier A5 whose output is connected to the inputs of amplifiers A3 and A4.

By this mounting there is obtained a subjection of the current of motor 26 permitting maintaining a stable speed of the latter under different mode conditions, without thereby requiring a tactometer. Thus, the voltage in the lower leg 56 of the H-shaped bridge, proportional to the current in the motor, is amplified by the amplifier A5 and summed at the voltage setting leaving S3 or S4. If the load couple of the motor increases, its current increases and the voltage in the motor also increases. There is thus compensated the effect of the internal resistance of the motor which has the effect of decreasing the voltage induced in the rotor. This subjection of current is useful at low speed wherein the variations of the load couple will give rise to important variations of speed.

Thus, this control unit 35 permits, thanks to a logic circuit L receiving data concerning the relative position x of the two cursors 12, 20 and acting on switches, controlling precisely and reliably the operation of the controlled motor either by the user or by the position detector, resulting in advantageous interaction between the two modes of operation.

Of course, the embodiment described above is in no way limiting and can be the subject of any desired modification within the scope defined by claim 1. In particular, the column of the instrument can be replaced by a support in any vertical or horizontal or any other position, but constituting a rail or a guide means for the carriage. The cursors of this latter could be replaced by a first portion forming the carriage itself and a second portion constituted by a member of reduced size adapted to be displaced, for example by translation of pivoting, relative to the carriage. Between these two portions or carriage cursors, other members, such as a trigger or a counterweight balancing the weight of the measuring cursor, could be installed. The spring compensating the weight of the second portion could in certain applications be omitted.

The device producing the measuring force could have any other construction; it could for example be constituted by a finger secured to the second portion disposed between two springs mounted on the first portion.

The invention could be so arranged as to effect the measurement only according to a single horizontal, vertical or any other direction, for example by descending on the member to be measured. It does not therefore comprise a single measuring position instead of two measuring positions.

Other position detectors, for example capacitative, inductive, optical or resistive, would be equally useful.

There could also used a motor of another type, for example a step wise, synchronous, continuous current without collector, etc.

The control of the motor could make use of other techniques, such as the modulation of impulses or of frequencies. The control contacts 42, 43 could be replaced by other control devices, such as potentiometers, peripheral computers, mice, track balls, joy sticks, or digital controls.

The instrument according to the invention, could easily be integrated into installations operating according to several axis or instruments adapted for the measurement of angles.

What is claimed is:

1. Instrument for measuring lengths or angles comprising a rail (10), a carriage (11) disposed on said rail, the carriage (11) having a first portion (12) adapted to be driven along the rail (10) and a second portion (20) driven by the first portion (12) along the rail, and carrying a measuring contact (24) adapted to coact with a member to measured, the second portion (20) being adapted to be displace relative to the first portion (12) against the force of a retention element (25) from a rest position (R) toward at least one measuring position (M1, M2) in which the measuring contact (24) exerts a predetermined measuring force on the piece to be measured; the improvement wherein the instrument comprises a motor (15) arranged to drive the first portion (12) along the rail (10) and a position detector (36) adapted to measure the relative displacement (x) between the two portions (12, 20) of the carriage and to act on the motor member (15) to drive the first portion (12) such that the second portion (20) occupies a relatively predetermined position with respect to the first portion corresponding to said measuring position.

2. Instrument according to claim 1, which further comprises first control means (36, A1, A2) arranged to receive signals (44) corresponding to the relative position (x) between the two portions (12, 20) of said position detector (36) and to control by means of first settings the motor (15) such that it takes a relatively constant position between the two portions (12, 20) corresponding to the measuring position (M1, M2), the first portion (12) being driven so as to follow the second portion (20) when the measuring contact (24) of this latter occupies different positions relative to the rail (10) on the member to be measured.

3. Instrument according to claim 2, which further comprises second control means (42, 43) adapted to receive external instruction and to control by means of second settings of the motor (15) so as to displace the first portion. (12) when the second portion (20) occupies said rest position (R).

4. Instrument according to claim 3, which further comprises a control unit (35) comprising said first and second control means (36, A1, A2; 42, 43), this control unit being arranged
   a) so as to render active second control means (42, 43) when said signals (44) received from the position detector (36) are lower than an upper limit value (VP2) and greater than a lower limit (VP1), and
   b) so as to render active the first control means (36, A1, A2), when said signals (44) received from the position detector (36) are either above the upper limit (VP2) to establish a first measuring position (M2) between the two portions of the carriage, or below the lower limit (VP1) to obtain a second measuring position (M1) between the two portions of the carriage.

5. Instrument according to claim 4, wherein the control unit (36) is arranged
   a) so as to control the motor (15) by means of first forward or reverse settings emitted by said first control means (36, A1, A2) and by means of second forward or reverse settings emitted by said second control means (42, 43),
   b) so as to inhibit the second forward setting when said received signals (44) are higher than the upper limit (VP2),
   c) so as to inhibit the second reverse setting when said received signals (44) are below the lower limit (VP1),
   d) so as to inhibit the first forward and reverse settings even when the received signals (44) are below the lower limit (VP1) and the second forward setting is actuated, or when the received signals (44) are above the upper limit (VP2) and the second reverse setting is actuated.

6. Instrument according to claim 1, wherein the position detector (36) is arranged so as to operate with physical size varying substantially linearly with the relative displacement (x) between the two portions (12, 20) of the carriage.

7. Instrument according to claim 6, characterized by the fact that the position detector (36) is a Hall effect detector (37).

8. Instrument according to claim 5, wherein the second control means comprised two control buttons, (42, 43)

arranged so as to emit forward speed settings and respectively reverse speed settings, corresponding to forward speeds of rotation and reverse of rotation, of the motor, which increase with increasing pressure exerted on these buttons.

9. Instrument according to claim 8, wherein the buttons (42, 43) comprise piezoelectric elements.

10. Instrument according to claim 5, wherein the control unit (50) comprises a logic circuit (L) coacting with at least first comparators (C1, C2) arranged so as to compare the signals (44) received from the position detector (36) with said upper and lower limits (VP1, VP2) and arranged so as to actuate at least two first switches (S3, S4) each having a first inlet adapted to receive said first settings, a second inlet adapted to receive said second settings, and an output arranged so as to control the rotation of the motor (15).

11. Instrument according to claim 10, wherein the signals (44) received from the detector (36) are brought to a first input of two first amplifiers (A1, A2) whose gains are inverted relative to each other, the output of each amplifier being connected to one of the first switches (S3, S4) and the second input being adapted to be connected for each to a first or a second lag voltage (VO1, VO2; VO3, VO4), two seconds switches (S1, S2) controlled by one of the first comparators (C1, C2) being adapted to switch the second input between the first and second lag voltage according to whether the measuring position is above or below said limits (VP1, VP2).

12. Instrument according claim 10, wherein the motor is a DC motor (15) and the electronic circuit (50) of the control unit (35) is DC.

13. Instrument according claim 12, wherein the motor (15) is connected to the center of an H-shaped bridge (52) whose upper leg (53) is connected by means of two second amplifiers (A3, A4) to the first switches (S3, S4) and whose lower leg (56) is connected to these latter by means of two second comparators (C5, C6) adapted to compare the settings leaving the first switches (S3, S4) to start up threshold (V1) of the motor (15).

14. Instrument according to claim 13, characterized in that said lower branch (56) is connected to a third amplifier (A5) whose output is connected to the inputs of said second amplifiers (A3, A4) so as to ensure a stable speed of the motor (15) under different conditions of load.

15. Instrument according to claim 1, wherein the first portion of the carriage (11) is constituted by a first cursor (12) mounted slidably on the rail (10) and the second portion is constituted by a second cursor (20) mounted slidably on the first cursor (12) or on the rail (10).

* * * * *